(12) United States Patent
Kito et al.

(10) Patent No.: US 9,233,662 B2
(45) Date of Patent: Jan. 12, 2016

(54) VEHICLE-BODY FRONT STRUCTURE OF VEHICLE

(71) Applicant: MAZDA MOTOR CORPORATION, Hiroshima (JP)

(72) Inventors: Masatoki Kito, Hiroshima (JP); Hiroshi Sogabe, Aki-gun (JP); Hirofumi Takada, Higashihiroshima (JP); Tsutomu Watanabe, Hiroshima (JP); Arihiro Furumoto, Hiroshima (JP); Ryuma Murakami, Hiroshima (JP); Takayuki Nakamae, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/454,430

(22) Filed: Aug. 7, 2014

(65) Prior Publication Data
US 2015/0054307 A1 Feb. 26, 2015

(30) Foreign Application Priority Data

Aug. 21, 2013 (JP) ................................ 2013-171392

(51) Int. Cl.
*B60R 21/34* (2011.01)
*B62D 25/08* (2006.01)
(Continued)

(52) U.S. Cl.
CPC ................ *B60R 21/34* (2013.01); *B60R 19/12* (2013.01); *B62D 25/08* (2013.01); *B60R 2021/002* (2013.01); *B60R 2021/0004* (2013.01);
(Continued)

(58) Field of Classification Search
CPC .................... B60R 21/34; B60R 19/12; B60R 2021/0004; B60R 2021/002; B60R 2021/053; B60R 2021/343; B60R 2021/0037; B62D 25/08
USPC ............... 296/187.04; 293/133, 155; 180/274
See application file for complete search history.

(56) References Cited

U.S. PATENT DOCUMENTS 6,540,275 B1 * 4/2003 Iwamoto et al. ................ 293/24
7,004,532 B2 * 2/2006 Cartella .................... 296/187.04
(Continued)

FOREIGN PATENT DOCUMENTS

DE      600 09 985 T2    9/2004
DE      600 17 697 T2    12/2005
(Continued)

OTHER PUBLICATIONS
An Office Action issued by the German Patent Office on Feb. 23, 2015, which corresponds to German Patent Application No. 10 2014 011 134.2 and is related to U.S. Appl. No. 14/454,430; with English language translation.

*Primary Examiner* — Dennis H Pedder
(74) *Attorney, Agent, or Firm* — Studebaker & Brackett PC (57) ABSTRACT

A protecting member includes a pair of right-and-left brackets which extend obliquely downward and forward from front portions of a pair of right-and-left side frames and a stiffener which extends in a vehicle width direction below a bumper beam and attached to front ends of the pair of right-and-left brackets. The protecting member has a load/deformation characteristic including a first stage from a collision start, a second stage after the first stage, and a third stage after the second stage. Herein, the first stage is set so as to restrain the obstacle from coming in below a vehicle-body front portion, the second stage is set so as to absorb collision energy to restrain a local deformation of the obstacle, and the third stage is set so as to flick the obstacle up.

2 Claims, 8 Drawing Sheets

(51) Int. Cl.
 *B60R 19/12* (2006.01)
 *B60R 21/00* (2006.01)

(52) U.S. Cl.
 CPC . *B60R2021/0037* (2013.01); *B60R 2021/0053* (2013.01); *B60R 2021/343* (2013.01)

(56) References Cited

U.S. PATENT DOCUMENTS

| | | | |
|---|---|---|---|
| 7,543,677 B2 * | 6/2009 | Igawa | 180/274 |
| 7,854,453 B2 * | 12/2010 | Tanabe | 293/102 |
| 8,287,036 B2 * | 10/2012 | Nakaura et al. | 296/203.02 |
| 2001/0030432 A1 | 10/2001 | Mansoor et al. | |
| 2003/0184122 A1 | 10/2003 | Thelen et al. | |
| 2008/0204210 A1 * | 8/2008 | Tanabe | 340/436 |
| 2012/0161473 A1 | 6/2012 | Schaefer | |

FOREIGN PATENT DOCUMENTS

| | | |
|---|---|---|
| DE | 601 07 570 T2 | 12/2005 |
| DE | 601 06 603 T2 | 2/2006 |
| DE | 10 2010 056 390 A1 | 6/2012 |
| EP | 1 300 293 A1 | 4/2003 |
| JP | 2006-264495 A | 10/2006 |
| JP | 2007-515348 A | 6/2007 |
| JP | 2009-179139 A | 8/2009 |
| JP | 2013-056604 A | 3/2013 |
| WO | 2005/063532 A1 | 7/2005 |

* cited by examiner

VEHICLE-BODY FRONT STRUCTURE OF VEHICLE

BACKGROUND OF THE INVENTION

The present invention relates to a vehicle-body front structure of a vehicle.

An automotive vehicle, as a vehicle, comprises a pair of right-and-left side frames extending longitudinally at a vehicle-body front portion and a bumper beam extending in a vehicle width direction and attached to respective front ends of the pair of right-and-left side frames. Further, the automotive vehicle may be equipped with a protecting member including a stiffener (which may be called a lower bumper beam) extending in the vehicle width direction which is provided below the bumper beam in order that when a vehicle collides with a front obstacle, especially when a pedestrian's leg portion hits, the obstacle is restrained from coming in below the vehicle-body front portion. As the above-described protecting member, a structure which can effectively absorb collision energy (impact) in the collision with a properly short stroke is disclosed in Japanese Patent Laid-Open Publication No. 2009-179139.

Herein, in a case in which the front obstacle is a pedestrian, the protecting member collides with the pedestrian's leg portion. In this case, preventing the obstacle from coming in below the vehicle-body front portion can be achieved by the protecting member itself. Further, restraining partial deformation of the obstacle (an injury of the leg portion, for example) may be provided by energy absorption through deformation of the protecting member. Particularly, the protecting member may collide with a lower portion of the pedestrian's leg portion (a portion below a knee), whereas a front end portion of an engine hood (a bonnet) of the vehicle collides with an upper portion of the leg portion above the knee, so that the collision energy (impact) may be properly absorbed through its dispersion at the upper and lower portions of the leg portion.

Meanwhile, in a vehicle, such as a sports car, in which the level of a front end of the engine hood (or a front end of a vehicle-body exterior member positioned in front of the engine hood) is considerably low, it may be difficult to absorb the collision energy at a higher level than the knee of the leg portion of the pedestrian as the obstacle, for example. Particularly, in a case in which the obstacle is the pedestrian, it may be preferable that the pedestrian be flicked up onto the engine hood after the collision.

According to the protecting member of the above-described patent document, however, it may be difficult to obtain both the energy absorption sufficient for the partial deformation restraint of the obstacle and the flicking-up of the obstacle by means of the protecting member only. Especially, since a load/deformation characteristic showing a relationship of a collision load and a deformation amount of the protecting member of the above-described patent document is configured such that the deformation amount increases substantially proportionally to an increase of the collision load, it may be difficult to satisfy both the sufficient energy absorption in the collision and the flicking-up of the obstacle by means of the protecting member only.

SUMMARY OF THE INVENTION

The present invention has been devised in view of the above-described matters, and an object of the present invention is to provide a vehicle-body front structure of a vehicle which can properly achieve the sufficient energy absorption in the collision and the prompt flicking-up of the obstacle, preventing the obstacle from coming in below the vehicle-body front portion.

According to the present invention, there is provided a vehicle-body front structure of a vehicle, comprising a pair of right-and-left side frames extending longitudinally at a vehicle-body front portion, a bumper beam extending in a vehicle width direction and attached to respective front ends of the pair of right-and-left side frames, a protecting member including a pair of right-and-left brackets extending obliquely downward and forward from respective front portions of the pair of right-and-left side frames and a stiffener extending in the vehicle width direction below the bumper beam and attached to respective front ends of the pair of right-and-left brackets, wherein the protecting member is configured to have a load/deformation characteristic showing a relationship of a collision load and a deformation amount which is obtained thereby in a collision thereof with a front obstacle includes a first stage from a collision start, a second stage after the first stage, and a third stage after the second stage, the first stage of the load/deformation characteristic being set so as to make the protecting member restrain the obstacle from coming in below a vehicle-body front portion, the second stage of the load/deformation characteristic being set so as to make the protecting member absorb collision energy to restrain a local deformation of the obstacle, the third stage of the load/deformation characteristic being set so as to make the protecting member flick the obstacle up. Herein, the above-described bracket may be attached to a front end portion of the side frame directly or indirectly via another member, such as a setting plate.

According to the present invention, by setting the load/deformation characteristic of the protecting member so that the restraint of the obstacle from coming in below the vehicle-body front portion, the restraint of the local deformation of the obstacle, and the flicking-up of the obstacle can be obtained, there can be provided the superior protecting member in the safety for the obstacle. Particularly, in a vehicle not having any portion which collides at a sufficiently-higher level than a knee portion of a pedestrian, for example, the energy absorption can be achieved sufficiently.

According to an embodiment of the present invention, the load/deformation characteristic of the protecting member is set such that an increasing ratio of the deformation amount relative to the collision load in the second stage is greater than that in the first stage or the third stage. In this embodiment, specific setting of the load/deformation characteristic is provided, so that the above-described effects of the present invention can be obtained surely.

According to another embodiment of the present invention, the restraint of the obstacle from coming in in the first stage, the collision-energy absorption in the second stage, and the flicking-up of the obstacle in the third stage are achieved by the brackets and the stiffener. In this case, the above-described performances in the three stages can be achieved surely by using both the stiffener and the brackets effectively According to another embodiment of the present invention, the restraint of the obstacle from coming in the first stage, the collision-energy absorption in the second stage, and the flicking-up of the obstacle in the third stage are achieved by the stiffener. In this case, the above-described performances in the three stages can be achieved by the stiffener only.

According to another embodiment of the present invention, an energy absorbing member extending in the vehicle width direction is attached to a front face of the bumper beam, and a front end of an engine hood or a front end of a front vehicle-body exterior member which is substantially flatly continuous from the front end of the engine hood is positioned in front of the energy absorbing member. In this embodiment, in a vehicle in which the front end of the engine hood or the front end of the front vehicle-body exterior member which is substantially flatly continuous from the front end of the engine hood is located at a considerably low level, the above-described effects can be obtained. Further, when the obstacle is flicked up in the third stage, a lower portion of the obstacle which is located below the front end of the engine hood or the front end of the front vehicle-body exterior member can be properly flicked up by utilizing the above-described front ends as a fulcrum, so that the obstacle can be properly flicked up onto the engine hood and thereby the protection of the obstacle can be achieved surely.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Figure 1:
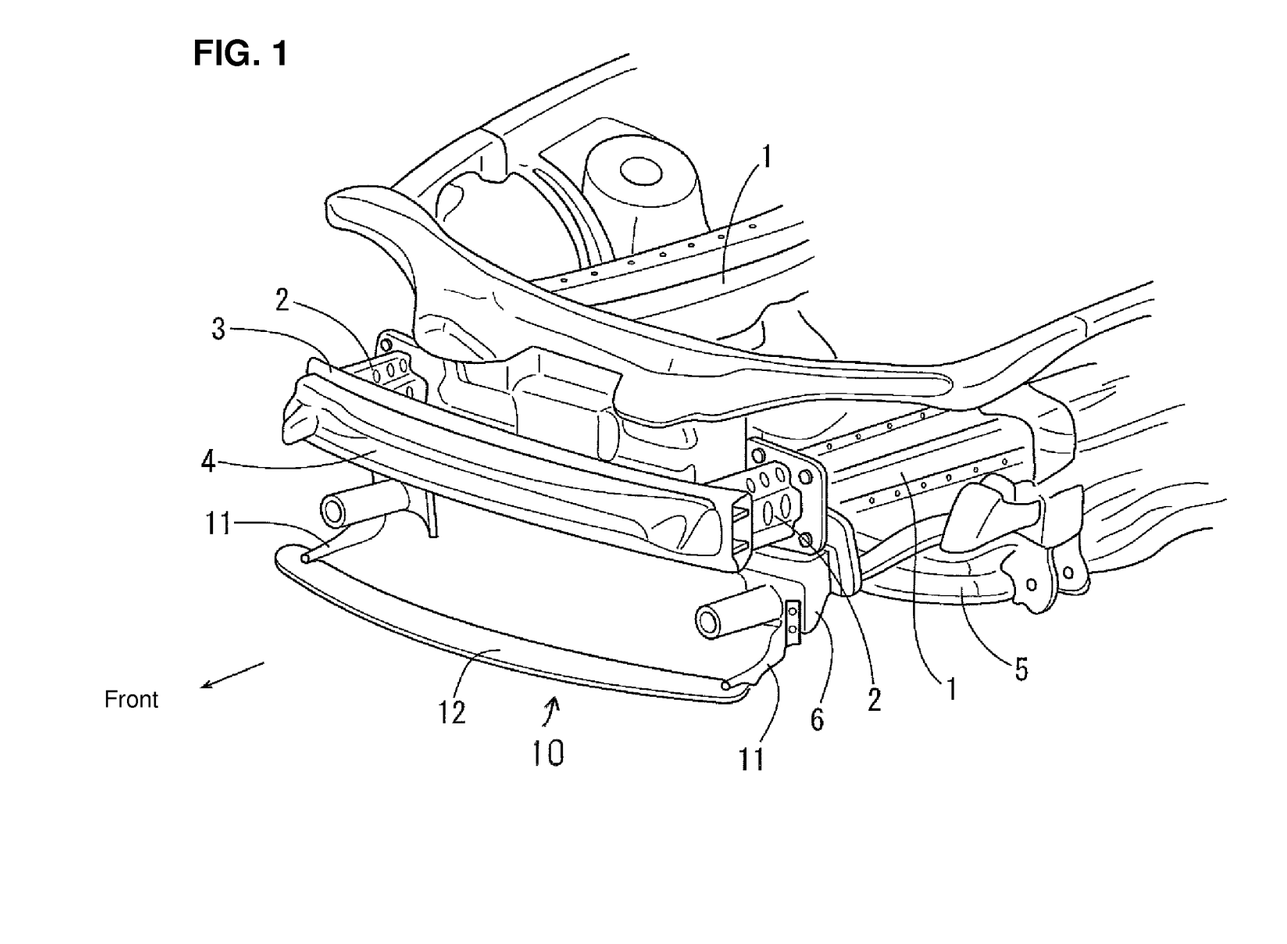
FIG. 1 is a perspective view showing an embodiment of a front structure of a vehicle to which the present invention is applied.

In FIG. 1 showing a front structure of a vehicle, reference character 1 denotes side frames (front side frames) as vehicle-body reinforcing members extending longitudinally. A crash can 2 is attached to a front end of each of the side frames 1. A bumper beam 3 as a reinforcing member extending in a vehicle with direction is attached to a pair of right-and-left crash cans 2. An energy absorbing member 4 which extends in the vehicle width direction is attached to a front face of the bumper beam 3. The energy absorbing member 4 is made from synthetic resin, for example. In FIG. 1, reference character 5 denotes a suspension cross member (suspension frame).

A protecting member 10 which is comprised of brackets 11 and a stiffener (lower bumper beam) 12 is attached to front end portions of the side frame 1 via setting plates 6 as reinforcing members. The bracket 11 and the stiffener 12 are made of a steel-based metal plate, respectively, for example. Herein, the above-described protecting member 10 (the brackets 11 and the stiffener 12) may be attached to the front end portions of the side frames 1 directly without provided any member, such as the above-described setting plates 6.

Figure 2:
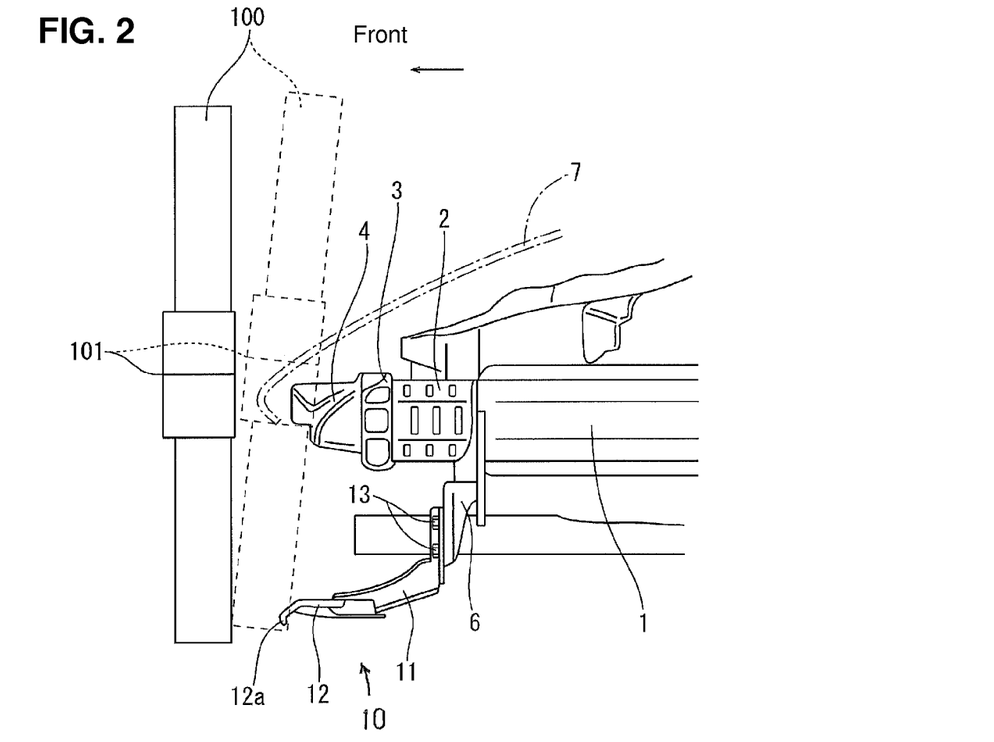
FIG. 2 is a side view of a front portion of the vehicle shown in FIG. 1, which shows a state in which the vehicle collides with an obstacle which is configured to extend vertically.

In FIG. 2, reference character 7 denotes an engine hood (a bonnet) as a vehicle-body exterior member, a front end of which is positioned just in front of the energy absorbing member 4. That is, in the vehicle of the present embodiment, the engine hood 7 is located at a considerably low level, specifically the height of energy absorbing member 4 from a road surface is set at a low level of about 40-50 cm. Herein, the vehicle may be further equipped with a front vehicle-body exterior member (not illustrated) which is flatly continuous from the front end of the engine hood 7 and positioned just in front of the energy absorbing member 4. The present invention is, of course, applicable to any vehicle in which the front end of the engine hood 7 or a front end of the above-described front vehicle-body exterior member is located above the level of the energy absorbing member 4.

Figure 3:
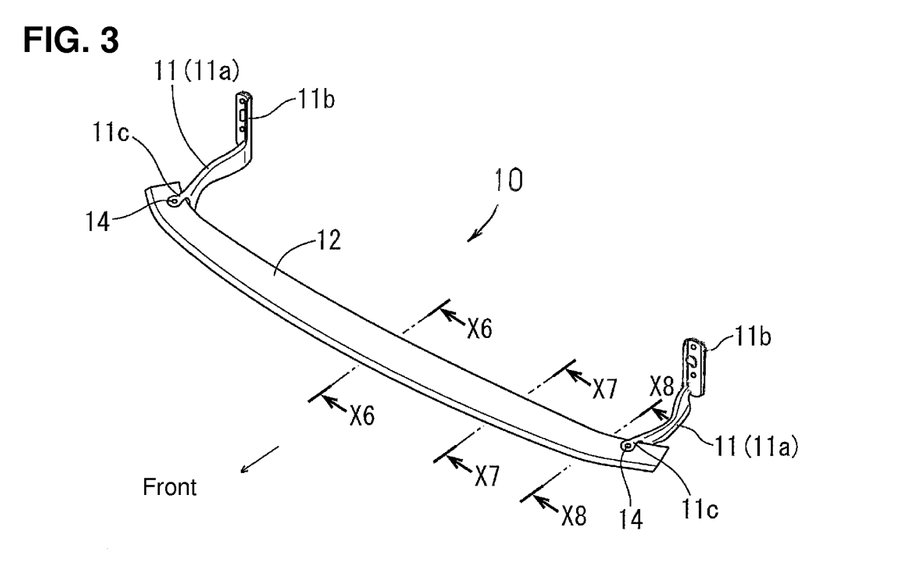
FIG. 3 is a perspective view of an embodiment of brackets and a stiffener which are used for the vehicle shown in FIG. 1.
Figure 4:
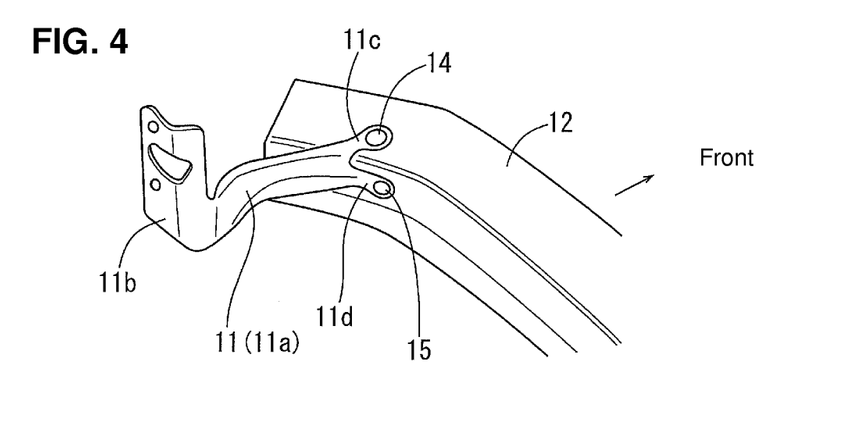
FIG. 4 is a perspective view of a connection portion of the bracket and the stiffener shown in FIG. 3, when viewed from a rear side.
Figure 5:
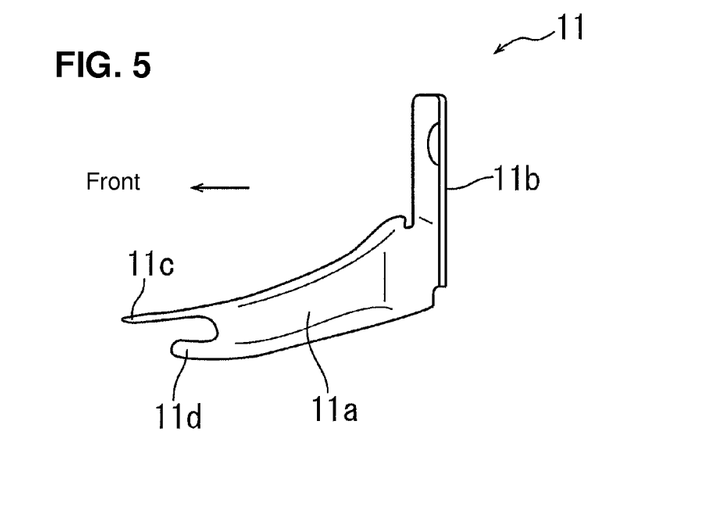
FIG. 5 is a side view of the bracket shown in FIG. 3.

Next, the bracket 11 and the stiffener 12 as the protecting member 10 will be described referring to FIGS. 2-5. The bracket 11 comprises, as shown in FIG. 5 particularly, a body portion 11a having a width which increases gradually toward the rear side, an attaching bracket portion 11b which is formed at a rear end portion of the body portion 11a and extends vertically, and a pair of front attachment portions 11e, 11d which are formed at a front end portion of the body portion 11a. In a state in which the flange portion 11b contacts the setting plate 6, the flange portion 11b is fixed to the setting plate 6 by means of a fixation member 13, such as bolts (see FIGS. 1 and 2). In this fixation state, the bracket 11, i.e., the body portion 11a, takes its position in which it extends obliquely downward and forward (see FIGS. 2 and 5).

The stiffener 12 extends in the vehicle width direction at a lower position below the level of the bumper beam 3 and fixed to respective front ends of a pair of right-and-left brackets 11. As shown in FIGS. 3 and 4, the front attachment portions 11e of the brackets 11 are fixed to an upper face of the stiffener 12 (by welding or by means of fixation members, for example). This fixation portion is denoted by reference character 14. The front attachment portions 11d of the brackets 11 are fixed to a rear face of the stiffener 12 (by welding or by means of fixation members, for example). This fixation portion is denoted by reference character 15.

Figure 6:
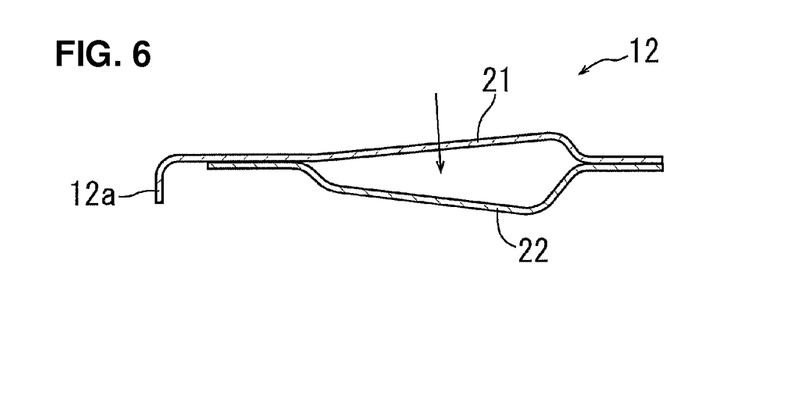
FIG. 6 is a sectional view taken along line X6-X6 of FIG. 3.
Figure 7:
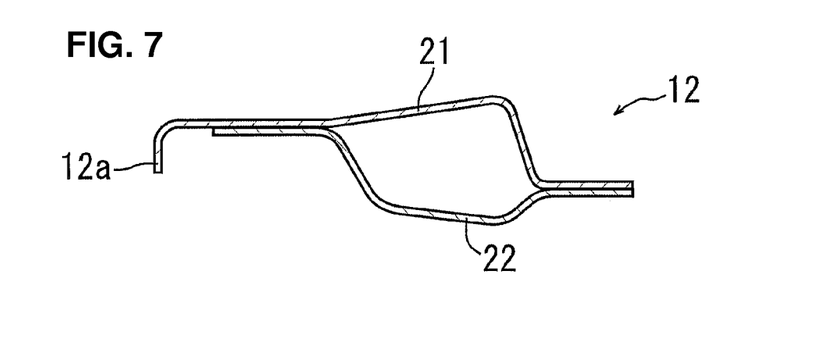
FIG. 7 is a sectional view taken along line X7-X7 of FIG. 3.
Figure 8:
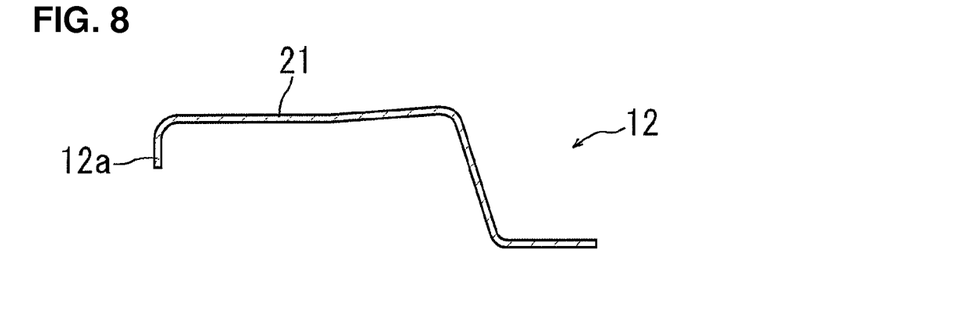
FIG. 8 is a sectional view taken along line X8-X8 of FIG. 3.

Sectional structures of the stiffener 12 are shown in FIGS. 6-8. FIG. 6 shows a cross section of a central portion, in the vehicle width direction, of the stiffener 12, FIG. 8 shows a cross section of a portion of the stiffener 12 around the fixation portion of the stiffener 12 to the bracket 11, and FIG. 7 shows a cross section of another portion located between the respective positions shown in FIGS. 6 and 8. As shown in FIGS. 6 and 7, the stiffener 12 is comprised of a first member 21 and a second member 22, and configured such that its front end portion has an open cross section and its rear end portion has a closed cross section. The longitudinal width of the cross section of the central portion, in the vehicle width direction, of the stiffener 12 is the greatest, and it decreases gradually toward outward both ends of the stiffener 12. And, the above-described portion around the fixation portion of the stiffener 12 to the bracket 11 does have any member corresponding to the above-described second member 22 as shown in FIG. 8, and therefore it has an open cross section over its entire longitudinal length (a structure comprised of one plate member). Thus, by configuring the stiffener 12 such that the size of its closed cross section becomes smaller toward the outward ends of the stiffener 12, i.e., toward the brackets 11, and the portion of the stiffener 12 around the bracket 11 does not have any closed cross section, it is prevented that the rigidity of the outward-end portion of the stiffener 12 becomes too high, compared to that of the central portion, because of an influence of the bracket 11.

As shown in FIG. 2 particularly, the stiffener 12 is configured such that its front end portion having an open cross section shown in FIGS. 6 and 7 slants downward and forward in such a manner that it goes down toward the front. Further, a front end of the stiffener 12 is bent downward with a bending angle of about 90 degrees as shown in FIGS. 6-8. This bending portion is denoted by reference character 12a.

Herein, a case in which a pedestrian as the front obstacle, for example, hits against the protecting member 10 comprised of the brackets 11 and the stiffener 12 will be considered. In this case, the stiffener 12 collides with a leg portion of the pedestrian. In FIG. 2, a flex impactor corresponding to the pedestrian's leg portion is denoted by reference character 100, and a portion corresponding to a joint of a knee of the leg portion is denoted by reference character 101. As understood from FIG. 2, the energy absorbing member 4 hits against a portion around the knee-joint corresponding portion 101 and the stiffener 12 hits against a considerably low position (around an ankle) below the knee-joint corresponding portion 101.

Figure 9:
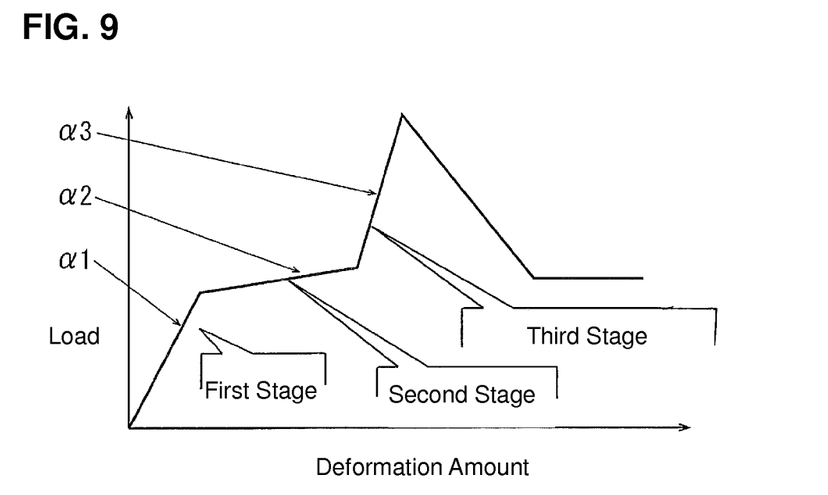
FIG. 9 is a characteristic diagram showing a load/deformation characteristic of a protecting member according to the present invention.

Next, the protection function of the pedestrian by the brackets 11 and the stiffener 12 in the case in which the vehicle collides with the pedestrian as the front obstacle will be described. First, a load/deformation characteristic showing a relationship of a collision load and a deformation amount which is provided by the brackets 11 and the stiffener 12 as the protecting member 10 is set as shown in FIG. 9. That is, in a first stage from a collision start, an increasing ratio of the deformation amount relative to the collision load is relatively small (high rigidity) as shown by a characteristic line α1 because of the stiffener 12. According to this first stage of the load/deformation characteristic, a situation in which the obstacle (the leg portion of the pedestrian, particularly) comes in below the vehicle-body front portion can be prevented.

In a second stage subsequent from the above-described first stage, the increasing ratio of the deformation amount relative to the collision load is relatively large (low rigidity) as shown by a characteristic line α2, compared to the first stage. That is, since the front end portion of the stiffener 12 slants downward and forward, the stiffener 12 deforms in such a manner that it slants downward and rearward when receiving the collision load (that is, the stiffener 12 deforms so as to approach its position in which it is aligned with the bracket 11). Thereby, the collision energy is absorbed, so that a local deformation of the leg portion of the pedestrian as the obstacle can be restrained properly.

In a third stage subsequent from the above-described second stage, the increasing ratio of the deformation amount relative to the collision load is relatively small (high rigidity) as shown by a characteristic line α3, compared to the second stage. That is, while the stiffener 12 deforms in such a manner that it slants downward and rearward so as to approach its position in which it is aligned with the bracket 11 in the above-described second stage, the position of the stiffener 12 in the third stage is finally substantially aligned with the bracket 11. Thereby, since the bracket 11 provides a large resistance against the deformation, the increasing ratio of the deformation amount relative to the collision load becomes smaller. In the present embodiment, the increasing ratio of the deformation amount relative to the collision load in the third stage is set to be the smallest. According to this third stage of the load/deformation characteristic, the pedestrian as the obstacle is flicked up. Herein, the pedestrian can be properly flicked up onto the engine hood 7 in such a manner that a lower portion of the pedestrian is flicked up with a fulcrum positioned around the energy absorbing member 4, so that the safety of the pedestrian can be achieved surely.

Figure 10:
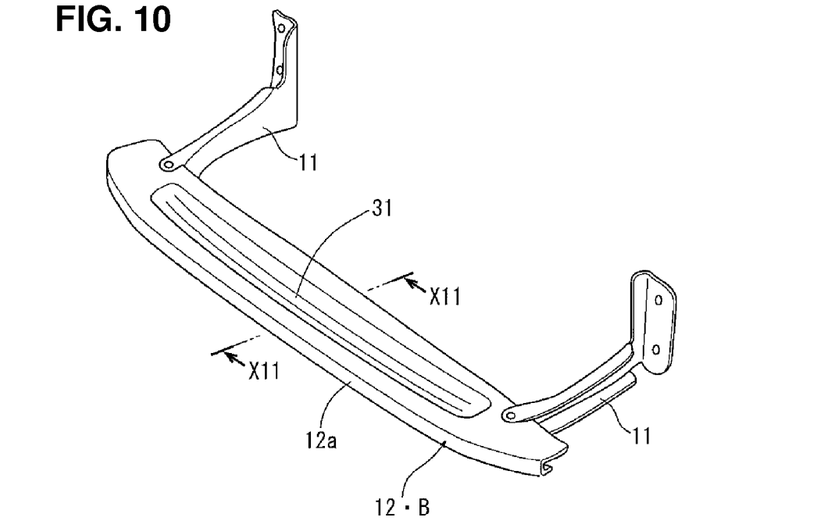
FIG. 10 is a major-part perspective view showing a second embodiment of the present invention.
Figure 11:
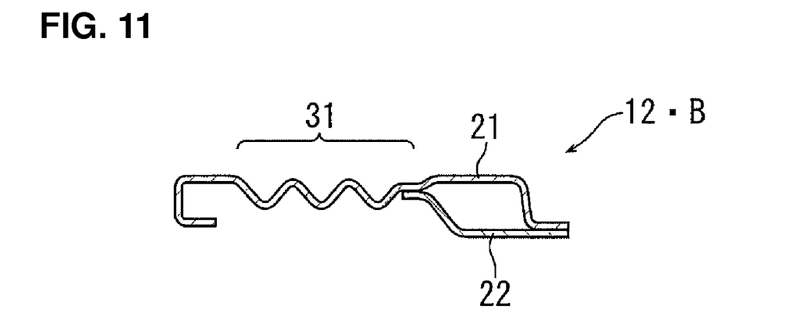
FIG. 11 is a sectional view taken along line X11-X11 of FIG. 10.

FIGS. 10 and 11 show a second embodiment of the present invention. In the present embodiment, the load/deformation characteristic shown in FIG. 9 is obtained by a stiffener 12-B (corresponding to reference character 12) only. That is, a longitudinally-middle portion of the stiffener 12-B is formed in a bellows shape as a low-rigidity portion 31, and front and rear portions of the stiffener 12-B are formed as a high-rigidity portion, respectively. The stiffener 12-B of the second embodiment is configured such that its front end portion has an open cross section and its rear end portion has a closed cross section, similarly to the above-described stiffener 12 of the first embodiment. In the second embodiment, the performances of the restraint of the obstacle from coming in the first stage, the collision-energy absorption in the second stage, and the flicking-up of the obstacle in the third stage are achieved, similarly to the first embodiment. In particular, in the second embodiment, the above-described performances in the first, second and third stages can be achieved only by setting the load/deformation characteristic of the stiffener 12-B.

Figure 12:
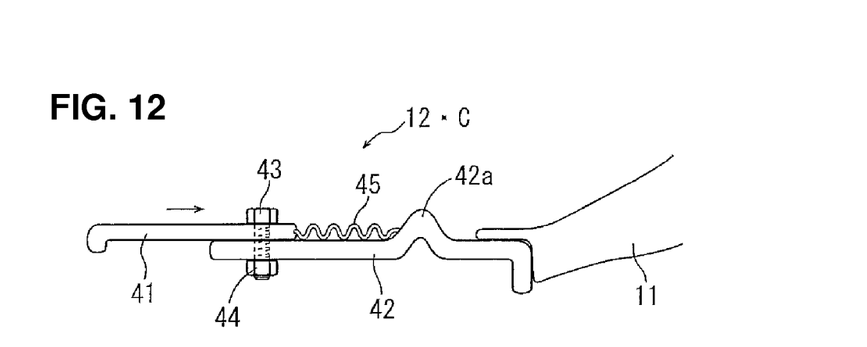
FIG. 12 is a major-part perspective view showing a third embodiment of the present invention.

FIG. 12 shows a third embodiment of the present invention. In the present embodiment, the load/deformation characteristic shown in FIG. 9 is obtained by a stiffener 12-C (corresponding to reference character 12) only, similarly to the second embodiment. That is, the stiffener 12-C is formed in a front-and-rear two split structure. A front end portion of a rear member 42 is fixed to a rear portion of a front member 41 by means of a fixation member of a bolt 43 and a nut 44. Further, a spring 45 as a resilient member is provided between the rear portion of the front member 41 and a convex portion 42a which is formed at the rear portion 42. When receiving a large collision load, the bolt 43 and the nut 44 release the above-described fixation of the members 41, 42. Consequently, the front member 41 slides rearward over the rear member 42, and the spring 45 is compressed accordingly.

In the third embodiment, the above-described performance in the first stage is achieved in a state before the spring 45 starts to be compressed (high rigidity), the above-described performance in the second stage is achieved while the spring 45 is compressed (low rigidity), and the above-described performance in the third stage is achieved in a state after the spring 45 is compressed completely (high rigidity).

Figure 13:
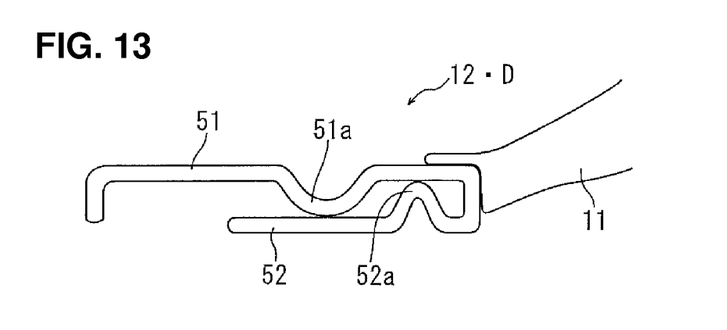
FIG. 13 is a major-part perspective view showing a fourth embodiment of the present invention.

FIG. 13 shows a fourth embodiment of the present invention. In the present embodiment, the load/deformation characteristic shown in FIG. 9 is obtained by a stiffener 12-D (corresponding to reference character 12) only. That is, the stiffener 12-D is formed, by bending a sheet of plate, in a double-layer structure having an upper member 5 and a lower member 52 which is positioned below a rear end portion of the upper member 5. A concave portion 51a is formed at a longitudinally-middle portion of the upper member 51. A convex portion 52a is formed at a portion of the lower member 52 which is located in back of the concave portion 51a.

In the fourth embodiment, the above-described performance in the first stage is achieved by supporting of the upper member 51 at an initial state of the collision (high rigidity), the above-described performance in the second stage is achieved by longitudinal crushing of the concave portion 51a (low rigidity), and the above-described performance in the third stage is achieved by contacting of the concave portion 51a with the convex portion 52a (high rigidity).

Figure 14:
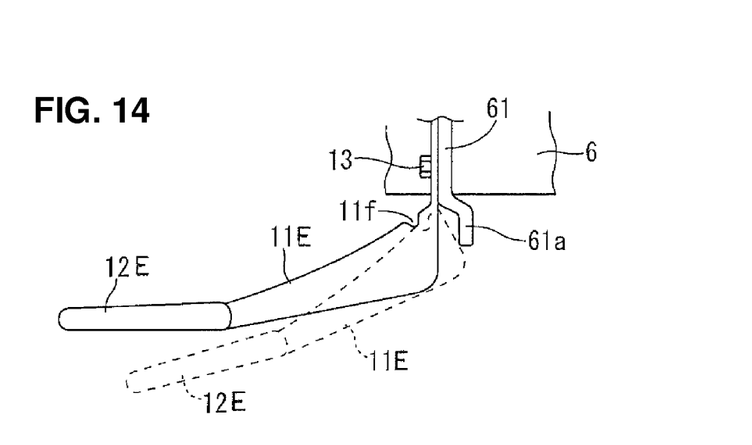
FIG. 14 is a major-part perspective view showing a fifth embodiment of the present invention.

FIG. 14 shows a fifth embodiment of the present invention. In the present embodiment, the load/deformation characteristic shown in FIG. 9 is obtained by both a bracket 11E (corresponding to reference character 11) and a stiffener 12E (corresponding to reference character 12). In the present embodiment, a notch portion 11f is formed at an upper portion of a rear end portion of the bracket 11E. Further, a stopper portion 61a which faces the rear end potion of the bracket 11E is formed at a setting plate 61 (corresponding to the setting plate 6 of the first embodiment). Herein, the load/deformation characteristic of the stiffener 12E itself is set, differently from the first embodiment, such that the deformation amount increases gradually in accordance with the increase of the collision load or the increasing ratio of the deformation amount relative to the collision load is constant (this is the same as other embodiments shown in FIGS. 15 and 16).

In the present embodiment, the above-described performance in the first stage is achieved by supporting of both the bracket 11E and the stiffener 12E at an initial state of the collision (high rigidity). The above-described performance in the second stage is achieved by downward-and-rearward rotating of the bracket 11E around the notch portion 11f (low rigidity). The above-described performance in the third stage is achieved by contacting of the rotating bracket 11E with the stopper portion 61a (high rigidity).

Figure 15:
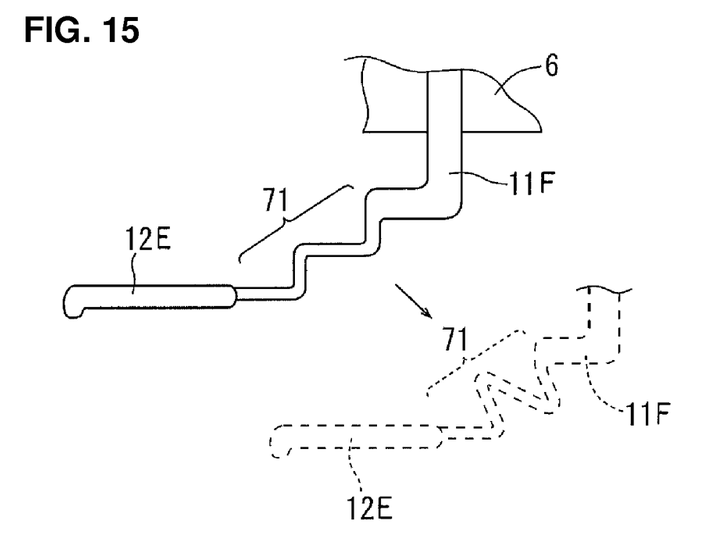
FIG. 15 is a major-part perspective view showing a sixth embodiment of the present invention.

FIG. 15 shows a sixth embodiment of the present invention. In the present embodiment, the load/deformation characteristic shown in FIG. 9 is obtained by both a bracket 11F (corresponding to reference character 11) and the stiffener 12E. In the present embodiment, the bracket 11F is configured such that its rear end portion which extends vertically has a large width, thereby a high rigidity, and its middle portion is formed in a step shape having a small width as a bending portion 71.

In the present embodiment, the above-described performance in the first stage is achieved by supporting of both the bracket 11E and the stiffener 12E at an initial state of the collision (high rigidity). The above-described performance in the second stage is achieved by bending deformation of the bending portion 71 of the bracket 11F which is shown by broken lines in FIG. 15 (low rigidity). The above-described performance in the third stage is achieved by receiving of the collision load at the high-rigidity rear end portion of the bracket 11F (high rigidity). Herein, the bracket 11F may be alternatively configured such that its high-rigidity rear end portion is extended downward so that its lower end portion is located at the same level as the stiffener 12E and also this extended portion is positioned behind the bending portion 71.

Figure 16:
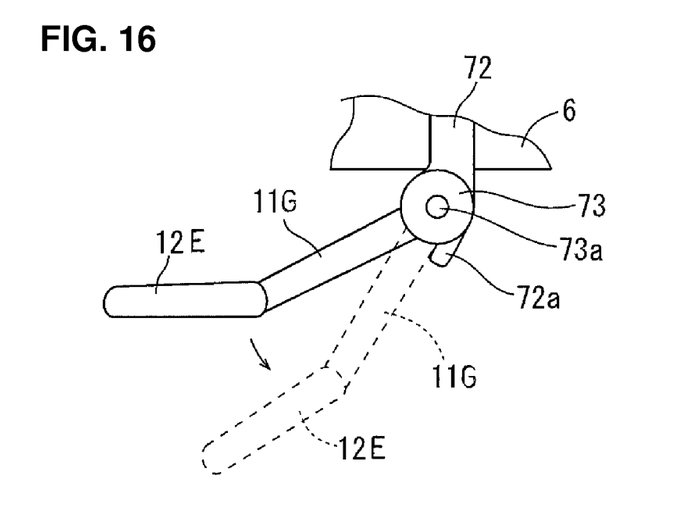
FIG. 16 is a major-part perspective view showing a seventh embodiment of the present invention.

FIG. 16 shows a seventh embodiment of the present invention. In the present embodiment, the load/deformation characteristic shown in FIG. 9 is obtained by both a bracket 11G and the stiffener 12E. In the present embodiment, an attaching member 72 having a high rigidity is fixed to the setting plate 6. Further, a rear end portion of the bracket 11G is pivotally connected to a rotational portion 73 which is provided at a lower end portion of the attaching member 72. Herein, a fastening torque of the bracket 11G at a rotational center of the rotational portion 73 (a pivotal center of the bracket 11G) is configured such that the bracket 11G is not rotated when receiving a relatively small rotational moment, but the bracket 11G is rotated downward and rearward around a rotational support point 73a when receiving a relatively large rotational moment. Further, a stopper portion 72a which faces a lower face of the rear end portion of the bracket 11G is formed at the attaching member 72.

In the present embodiment, the above-described performance in the first stage is achieved by supporting of both the bracket 11G and the stiffener 12E (high rigidity with no rotation around the rotational support point 73a). The above-described performance in the second stage is achieved by rotating of the bracket 11G around the rotational support point 73a, generating some rotational resistant force (low rigidity). The above-described performance in the third stage is achieved by contacting of the rotating bracket 11G with the stopper portion 72a (high rigidity).

The present invention should not be limited to the above-described embodiment, and any other modifications or improvements may be applied within the scope of the claimed invention. In the above-described embodiment shown in FIGS. 6-8, the stiffener 11 is not limited to the one which is comprised of two sprit-sheets of plate members 21, 22, and it may be made of a single sheet of plate which is formed through a bending process in the structure shown in FIGS. 6-8.

What is claimed is:

1. A vehicle-body front structure of a vehicle, comprising:
   a pair of right-and-left side frames extending longitudinally at a vehicle-body front portion;
   a bumper beam extending in a vehicle width direction and attached to respective front ends of the pair of right-and-left side frames;
   a protecting member including a pair of right-and-left brackets extending obliquely downward and forward from respective front portions of the pair of right-and-left side frames and a stiffener extending in the vehicle width direction below the bumper beam and attached to respective front ends of the pair of right-and-left brackets,
   wherein said stiffener is configured such that a front end portion thereof slants downward and forward and a front end thereof is bent downward, whereby the front end portion of the stiffener has an open cross section which opens downward,
   whereby said protecting member is configured to have a load/deformation characteristic showing a relationship of a collision load and a deformation amount which is obtained thereby in a collision thereof with a front obstacle includes a first stage from a collision start, a second stage after the first stage, and a third stage after the second stage, an increasing ratio of the deformation amount relative to the collision load in the second stage being greater than that in the first stage or the third stage, the first stage of the load/deformation characteristic being provided by existence of the stiffener so as to make the protecting member restrain the obstacle from coming in below the vehicle-body front portion, the second stage of the load/deformation characteristic being provided by downward deformation of the stiffener toward a position where the stiffener is aligned with the bracket in a side view so as to make the protecting member absorb collision energy to restrain a local deformation of the obstacle, the third stage of the load/deformation characteristic being provided by resistance against deformation of the stiffer and the bracket which are substantially aligned with each other in the side view as to make the protecting member flick the obstacle up.

2. The vehicle-body front structure of a vehicle of claim 1, wherein an energy absorbing member extending in the vehicle width direction is attached to a front face of said bumper beam, and a front end of an engine hood is positioned in front of the energy absorbing member.

* * * * *